US007684356B2

(12) United States Patent
Wu

(10) Patent No.: US 7,684,356 B2
(45) Date of Patent: Mar. 23, 2010

(54) SYSTEM AND METHOD FOR PROVIDING HOTLINE AND PREEMPTION FEATURES IN REAL-TIME COMMUNICATIONS USING PRESENCE AND PREFERENCE INFORMATION

(75) Inventor: Fuming Wu, Frisco, TX (US)

(73) Assignee: Alcatel Lucent, Paris (FR)

( * ) Notice: Subject to any disclaimer, the term of this patent is extended or adjusted under 35 U.S.C. 154(b) by 1370 days.

(21) Appl. No.: 11/112,363

(22) Filed: Apr. 22, 2005

(65) Prior Publication Data

US 2006/0239186 A1 Oct. 26, 2006

(51) Int. Cl.
*H04Q 11/00* (2006.01)

(52) U.S. Cl. ...................................... 370/260

(58) Field of Classification Search ................ 370/352, 370/260; 709/220, 203, 217, 206; 379/201.1; 707/10; 455/450
See application file for complete search history.

(56) References Cited

U.S. PATENT DOCUMENTS

| 6,081,592 | A | 6/2000 | Battle |
| 6,487,289 | B1 | 11/2002 | Phan et al. |
| 6,584,490 | B1 * | 6/2003 | Schuster et al. ............. 709/200 |
| 6,665,396 | B1 * | 12/2003 | Khouri et al. .......... 379/266.01 |
| 6,757,722 | B2 * | 6/2004 | Lonnfors et al. ............ 709/220 |
| 7,047,012 | B1 * | 5/2006 | Gerszberg et al. ........... 455/445 |
| 7,099,650 | B2 * | 8/2006 | Akgun et al. ............... 455/403 |
| 7,190,776 | B2 * | 3/2007 | Oman .................... 379/207.02 |
| 7,191,231 | B2 * | 3/2007 | Miernik et al. .............. 709/225 |
| 7,477,281 | B2 * | 1/2009 | Chandra et al. .......... 348/14.09 |
| 7,561,537 | B2 * | 7/2009 | Schrader et al. ............. 370/261 |
| 7,580,375 | B1 * | 8/2009 | Friedrich et al. ............ 370/260 |
| 2002/0095462 | A1 | 7/2002 | Beck et al. |

FOREIGN PATENT DOCUMENTS

| CN | 1452380 A | 10/2003 |
| WO | 0147231 A2 | 6/2001 |
| WO | 0237812 A2 | 5/2002 |

OTHER PUBLICATIONS

Patent Office of the People's Republic of China; First Office Action dated Jan. 9, 2009.

* cited by examiner

*Primary Examiner*—Ricky Ngo
*Assistant Examiner*—Chandrahas Patel
(74) *Attorney, Agent, or Firm*—Garlick Harrison & Markison

(57) ABSTRACT

A communications system for providing hotline and preemption features in real-time communication sessions includes a presence server for collecting presence and preference information for a presentity and a communications manager for handling requests for communication sessions with the presentity. The presence information includes availability of devices of the presentity, and the preference information includes a priority level granted to one or more watchers of the presentity. Upon receipt of a request from a watcher for a new communication session in a select media type, and in response to unavailability of the presentity due to a concurrent communication session in that media type, the communications manager determines the priority levels of the watchers for the new and concurrent communication sessions and preempts the concurrent communication session when the priority level of the watcher for the new communication session is greater than that of the watcher for the concurrent communication session.

21 Claims, 6 Drawing Sheets

SYSTEM AND METHOD FOR PROVIDING HOTLINE AND PREEMPTION FEATURES IN REAL-TIME COMMUNICATIONS USING PRESENCE AND PREFERENCE INFORMATION

BACKGROUND OF THE INVENTION

1. Technical Field of the Invention

The present invention relates in general to a presence-based interactive communications system, and in particular, to providing hotline and preemption features for real-time, interactive communication sessions.

2. Description of Related Art

Presence-based interactive communication services facilitate more efficient and effective communication sessions by enabling callees (presentities) to publish, in real time, their presence information (such as, the availability, activity, local time, location, current status of the active devices/applications, etc.) and their preference information (e.g., device preferences) to callers (presence watchers). The presence and preference information improves the efficiency of establishing real-time voice, text and multi-media communication sessions, such as "Click-to-Talk" for real-time voice, "Click-to-Text" for real-time text, "Click-to-MM" for real-time multi-media (video+) and "Click-to-Conferencing" for real-time conferencing with a particular real-time media type (e.g., voice, text or multi-media).

Presence systems typically incorporate a presence server to manage the presence and preference information for a plurality of presentities. Presence servers automatically receive updated presence information from various presence sources, such as calendar/scheduler applications, telephone applications or instant messaging applications. The presence server collects this presence information from the presence sources, and aggregates the presence information to reflect the presence status of the presentities, which can then be provided to watchers of the presentities to assist the watchers in establishing real-time communication sessions with the presentities.

For example, when a presentity initiates or receives a voice call on his or her desktop phone, the presence server is notified and changes the presence status of the presentity to "On the Phone." If the presentity does not have another voice channel (e.g., another line or another device, such as a cell phone) available for a voice communication session, a watcher will be unable to establish a real-time voice communication session with the presentity. If the watcher is an important watcher, such as the presentity's boss or a customer, or if the communication session is urgent, the failure of that communication session may be undesirable, or even detrimental, to the presentity.

However, in current presence systems, the presentity is not able to prioritize the importance of watchers or communication sessions according to different priority levels. For example, depending upon the importance of the watcher to the presentity, or the category of the watcher, the presentity may want to allow the watcher to preempt an ongoing communication session with the presentity. As used herein, the term "preempt" refers to the watcher's ability to disrupt (or terminate) the ongoing real-time communication session and establish a new communication session with the presentity.

In addition, preemption features are particularly important in government and military applications, where "hotlines" are commonly used to guarantee an immediate direct connection between two parties. Moreover, preemption features are necessary to ensure that emergency or otherwise urgent communication sessions are immediately routed to the proper media channel via which the presentity can be reached. However, current presence systems do not provide preemption features that allow a presentity to assign different priority levels to different watchers, different media types or different types of communication sessions. Therefore, what is needed is a communication system capable of providing preemption features for real-time, interactive communication sessions.

SUMMARY OF THE INVENTION

Embodiments of the present invention provide a communications system for providing hotline and preemption features in real-time communication sessions. The communications system includes a presence server for collecting presence information and preference information for a presentity and a communications manager for handling requests for communication sessions with the presentity. The presence information includes availability of devices of the presentity, and the preference information includes a priority level granted to one or more watchers of the presentity.

Upon receipt of a request from a watcher for a new communication session in a select media type with the presentity, and in response to unavailability of the presentity due to a concurrent communication session in that media type, the communications manager determines the priority levels of the watchers for the new and concurrent communication sessions. The communication manager then preempts the concurrent communication session when the priority level of the watcher for the new communication session is greater than the priority level of the watcher for the concurrent communication session.

In one embodiment, the preference information includes priority levels for each of the watchers per media type. In a further embodiment, the preference information includes priority levels for each presentity device for each of the watchers. In still a further embodiment, the preference information includes one or more non-preemptive channels for one or more presentity devices to prevent preemption of the concurrent communication session when connected over one of the non-preemptive channels.

In another embodiment, the presence server is further operable to provide the presence information and preemptive priority information for each of the media types of the presentity to the watcher. The preemptive priority information indicates whether the new communication session can be preempted by another watcher.

In yet another embodiment, the communications manager is further operable to transmit notification messages to the presentity and watcher during the concurrent communication session notifying the presentity and watcher of the preemption of the concurrent communication session. In addition, the communications manager can provide a call back feature to the watcher of the concurrent communication session to continue the concurrent communication session upon the termination of another communication session with the presentity of that media type.

In still another embodiment, the priority level of the watcher for the new communication session can be altered based on the type of new communication session to provide emergency preemption. Moreover, the priority level of the watcher for the new communication session can be set to the highest priority level to provide a hotline between the presentity and the watcher for that media type.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
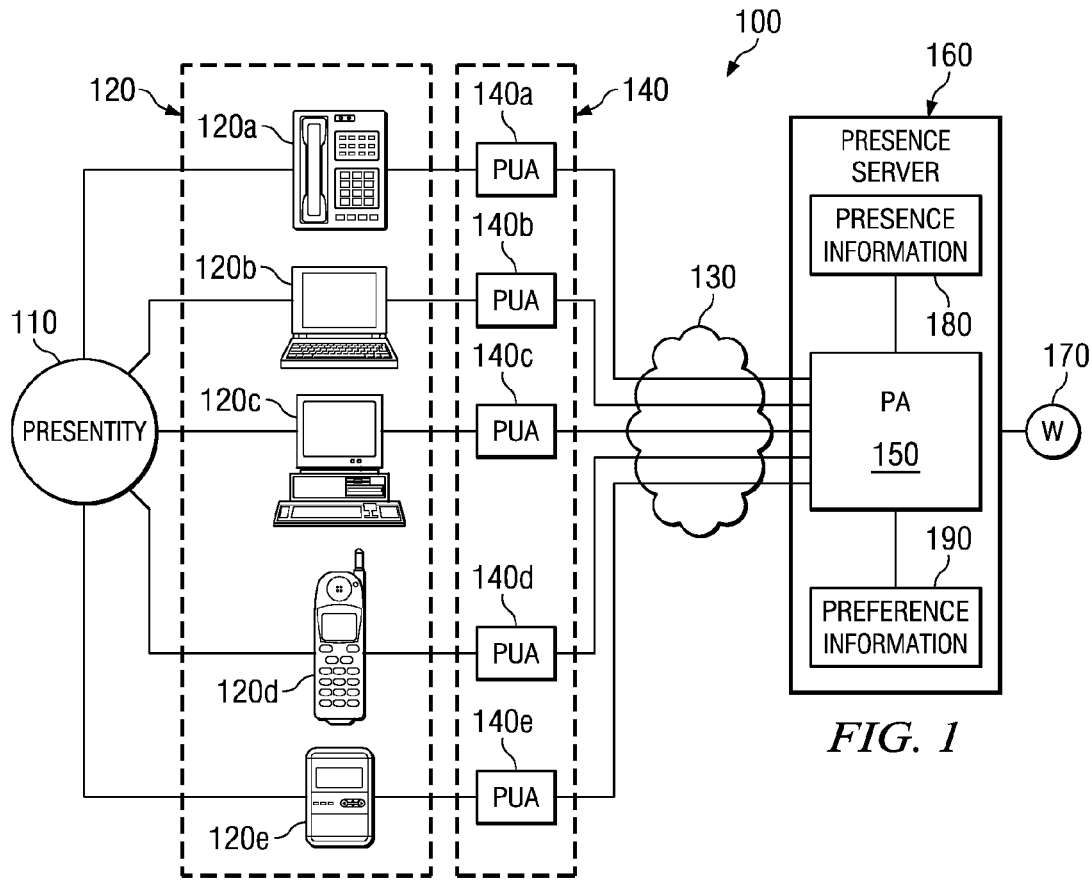
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes a presentity 110 and one or more devices 120 associated with the presentity 110. The presentity 110 represents the callee and provides presence information on the callee's presence status to the presence system 100. Each device 120 is a physical communications device capable of sending and/or receiving communications over a communications network 130. Examples of such devices 120 include, but are not limited to, a desktop phone 120a, a laptop computer 120b, a personal computer 120c, a cell phone 120d and a personal digital assistant (PDA) 120e. In FIG. 1, the communications network 130 represents any type of network over which media (circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing presence information for the presentity 110. In FIG. 1, a separate PUA 140 is shown for each device 120. However, it should be understood that in other embodiments, the number of PUAs 140 can vary based on the number and type of devices 120, the applications supported by the devices 120 and the system configuration. Each PUA 140 independently generates a component of the overall presence information for a presentity 110. Typically, PUA's 140 generate presence information when a change in presence status occurs. Examples of changes in presence status include, but are not limited to, turning on and off a device 120, modifying the registration from a device 120 and changing the instant messaging status on a device 120.

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110. In addition, the PA 150 collects presence information from other sources, such as a calendar/scheduler application (e.g., Microsoft Exchange Server®, IBM Lotus Notes® or other similar application) and an instant messaging application. The PA 150 aggregates the presence information from each of the sources and maintains the current complete presence information for the presentity 110. The PA 150 further provides the presence information to one or more watchers 170 (callers or communication session initiators) of the presentity 110.

The presence server 160 is a physical entity that can operate as either the PA 150 or as a proxy server for routing requests from watchers 170 to the PA 150. The presence server 160 stores the presence information 180 and preference information 190 for a plurality of presentities 110. Thus, the PA 150, in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union-Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence information relating to a particular callee (presentity 110) to be routed to the presence server 160 that maintains the presence information for the presentity 110. In operation, the presence server 160 and PA 150 may be co-located with the SIP proxy/registrar for efficiency purposes.

Figure 2:
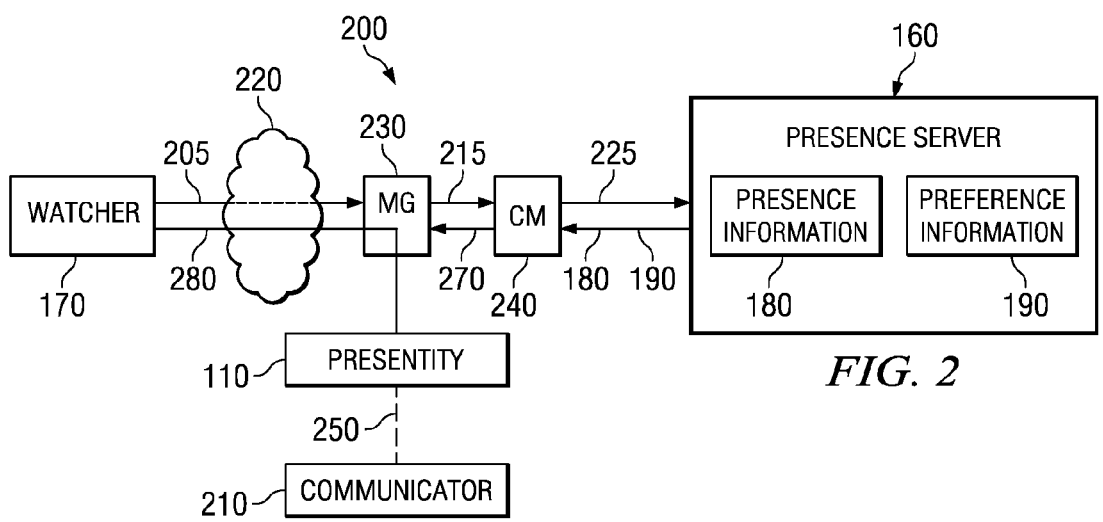
FIG. 2 illustrates an exemplary communications system for preempting a concurrent communication session with a presentity based on the presence information and preference information of the presentity, in accordance with embodiments of the present invention.

Referring now to FIG. 2, there is illustrated an exemplary communications system 200 for preempting a concurrent communication session 250 with a presentity 110 based on the presence information 180 and preference information 190 of the presentity 110, in accordance with embodiments of the present invention. In FIG. 2, a watcher (caller) 170 sends a request 205 for a new communication session 280 (e.g., real-time or non-real-time voice, text or multimedia) with a presentity (called subscriber) 110 to a media gateway (MG) 230 through a communications network 220 (e.g., PSTN, PLMN, LAN, Internet, etc.). The MG 230 includes any device, such as a circuit switch, router, gateway or other switching device that converts data from the format required by one type of network to the format required by another type of network. It should be understood that if the watcher 170 and the presentity 110 are both connected to the same network, the MG 230 may not be necessary.

In response to receipt of the request 205, the MG 230 sends a query 215 to a Communications Manager (CM) 240 for the presentity 110. The CM 240 manages communication sessions for the presentity 110 and other presentities/subscribers (watchers) registered with the presence server 160. The CM 240 is typically located on the called presentity's premises with the presence server 160. However, in other embodiments, the CM 240 may distributed or remote from the presence server 160. The CM 240 may be co-located with the MG 230 or the presence server 160 or may be implemented on a separate device.

The query 215 includes a session identification assigned to the new communication session 280 by the MG 230, the identity of the watcher 170 (e.g., caller uri), the identity of the presentity 110 (e.g., callee uri) and the requested media type for the new communication session 280. Upon receipt of the query 215, the CM 240 sends a request 225 to the presence server 160 for the presentity's presence information 180 and preference information 190. The CM 240 processes the returned presence information 180 and preference information 190 from the presence server 160 to determine the presence status of the presentity 110 for the requested media type.

For example, in one embodiment, from the presence information 180 and preference information 190, the CM 240 determines the media status and availability of the presentity for the requested communication session in the requested media type. As used herein, the term "media status" refers to one and only one of the following states at any particular time instance: INACTIVE, ACTIVE, IN USE, BUSY. In addition, as used herein, the term "availability" refers to one and only one of the following states at any particular time instance: AVAILABLE, UNAVAILABLE.

The presence information 180 includes each of the devices registered in the network to the presentity 110, along with the media types supported by each device and the media types supported by each application running on each device to obtain the media type capabilities of the presentity. In addition, the presence information 180 includes the on-going (concurrent) real-time communication sessions of the presentity 110. For example, the presence information 180 can include a current number of real-time voice communication sessions engaged in by the presentity 110, a current number of real-time multimedia communication sessions engaged in by the presentity 110 and a current number of real-time text communication sessions engaged in by the presentity 110. In FIG. 2, the presence information 180 of the presentity 110 indicates that the presentity 110 is engaged in a concurrent communication session 250 with communicator 210 (e.g., another watcher or other user) in the requested media type. The concurrent communication session 250 may be connected through the MG 230 or through another network device (e.g., switch, router, gateway, etc.).

Furthermore, in other embodiments, the presence information 180 can include an activity-media status mapping to update the media status of media types upon the start/termination of a scheduled activity, such as a meeting, out-to-lunch, steering a car, etc. For example, the presentity 110 may enter preference data into the presence system specifying that no media types or only certain media types are available when the presentity's calendar indicates that the presentity is in a meeting.

The CM 240 compares the current media status of the presentity 110 in the requested media type with preference information 190 specifying a maximum number of interactions per media type supported by various devices of the presentity into the presence system. The maximum number of interactions for a particular media type indicates the maximum number of real-time interactions a user/presentity can handle before the particular media status enters the BUSY state. The maximum number of interactions is specified by the user/presentity as part of his/her preference rules.

In one embodiment, the presentity can specify the maximum number of interactions for each media type separately. An example of single media type interactions is:
  text; 5, which indicates the user/presentity can simultaneously engage in five real-time text communication sessions on one or more devices before the status of the text media type enters the BUSY state;
  voice; 2, which indicates the user/presentity can simultaneously engage in two real-time voice communication sessions on one or more devices before the status of the voice media type enters the BUSY state; and
  mm; 1, which indicates the user/presentity can engage only one multimedia (video+) communication session at a time.

In another embodiment, the maximum number of interactions can be used to specify potential combinations amongst the three media types: text, voice, mm (video+). An example of a combination media type interaction is:
  text; 2+voice; 1, which indicates the user/presentity can simultaneously engage in two real-time text communication sessions on one or more devices plus one real-time voice communication session on either the same device as one or more of the text communication sessions or a different device.

It should be understood that the configuration of the maximum number of interactions by the presentity does not take into account the presentity's actual communication capability. For example, the user/presentity might only have one device supporting real-time voice communication, but he/she can still configure his/her maximum number of interactions as "voice; 2".

From the maximum number of interactions in the preference information 190 and the presence information 180 provided by the presence server 160, the CM 240 determines the media status (INACTIVE, ACTIVE, IN USE or BUSY) and availability (AVAILABILE or UNAVAILABLE) of the presentity 110 for the requested real-time communication session with the watcher 170 in the requested media type. For each media type, INACTIVE signifies that the user/presentity is not ready to process interactions with this specific media type. For example, the INACTIVE state applies when the presentity 110 is not logged onto the network using any device capable of supporting that specific media type. The ACTIVE state indicates that the user/presentity 110 is ready to process interactions with this specific media type. For example, the ACTIVE state applies when the presentity 110 is logged onto the network using one or more devices capable of supporting that specific media type.

For each media type, the IN USE state informs the watchers 170 and CM 240 that the presentity 110 is involved in one or more communication sessions using this specific media type. However, the presentity 110 is still capable of processing additional interactions with the same media type. For each media type, the BUSY state indicates that the presentity 110 is currently engaged in communication sessions using the specific media type, and is not capable of engaging in any additional communication sessions with the same media type. For example, the BUSY state might be caused by limitations of resources (e.g., communication channels), or by limitations of the presentity's capability (e.g., the maximum number of interactions for the specific media type has been reached).

If the presentity 110 is currently engaged in one or more concurrent communication sessions in the requested media type, such that the presentity's 110 media status in the requested media type is "BUSY," the CM 240 determines that the presentity 110 is UNAVAILABLE for the requested communication session. For example, in FIG. 2, the CM 240 determines that the presentity 110 is unavailable for the new requested communication session 280 due to the concurrent communication session 250 with communicator 210 (e.g., the maximum number of interactions for the requested media type is one communication session).

The CM 240 then determines whether the presentity 110 has granted a priority level to one or both of the watcher 170 and the communicator 210. For example, in one embodiment, the preference information 190 includes policies for different priority levels granted to watchers by the presentity. Thus, the CM 240 compares the identity of the watcher 170 and the identity of the communicator 210 to the preference information 190 to determine if the presentity 110 has set a specific priority level for either the watcher 170 or the communicator 210.

For example, an employee presentity may set a priority level for his/her boss to a high priority level, while setting the priority level of other members of the employee's team to a lower priority level, to enable the boss to preempt other communication sessions that the employee presentity may be currently involved in. As another example, the employee presentity may set a priority level for a customer to a higher priority level than that of the employee's team members, but a lower priority level than that of the employee's boss to enable the customer to preempt any communications sessions other than a communication session with the employee presentity's boss. As a further example, the employee presentity may set a priority level for an important customer to the same priority level as the employee's boss to enable the important customer to preempt other communication sessions, and prevent the employee's boss from preempting communication sessions with the important customer. As still a further example, the employee presentity may set a default priority level for an unknown caller to a low priority level to prevent the unknown caller from preempting other communication sessions. For example, the low priority level may indicate to the CM 240 that the communication session should be routed to the employee presentity's voice mail.

In a further embodiment, the presentity 110 can set the priority level of the watcher 170 to the highest priority level to provide a "hotline" between the presentity 110 and the watcher 170 for one or more media types. Hotlines are commonly used in government and military applications to guarantee an immediate direct connection between two parties. Hotlines can be unidirectional or bidirectional.

A unidirectional hotline is configured by only the presentity 110 to allow real-time contact with the presentity 110 by the watcher 170. Thus, a unidirectional hotline enables the presentity 110 to be reached at any time by the watcher 170 unless the media type corresponding to the hotline is in the INACTIVE state. For example, a unidirectional hotline can be established in group applications to enable the group leader to contact the individual group members or in doctor's offices to enable critical patients to contact the doctor at any time. A bidirectional hotline is configured by both the presentity 110 and the watcher 170 to guarantee that either the presentity 110 or the watcher 170 can reach the other party at any time. It should be understood that if the presentity 110 is initiating the hotline towards the watcher 170, the presentity 110 becomes the watcher and the watcher 170 becomes the presentity. Bidirectional hotlines can be established between presentities of the same presence system, or between subscribers of different presence systems if interoperability between the different presence systems is provided. For example, bidirectional hotlines can be established between division heads working for the same enterprise or CEO's of different enterprises.

Based on the priority levels granted to the watcher 170 and the communicator 210 by the presentity 110 in the preference information 190, the CM 240 determines whether the priority level granted to the watcher 170 is greater than the priority level granted to the communicator 210. If the watcher priority level is greater than the communicator priority level, the CM 240 preempts the concurrent communication session 250 between the presentity 110 and the communicator and establishes the new communication session 280 between the presentity 110 and the watcher 170. For example, the CM 240 can determine the presentity device for use in the new communication session 280, and transmits device information 270, such as the identity of the device, application and media channel of the presentity device, to the MG 230 to establish the new communication session 280.

In another embodiment, if the number of presentity media channels for that media type is greater than one (maximum interactions>1), and all media channels for that media type are currently involved in respective on-going communication sessions, the CM 240 determines the on-going communication session with the lowest priority. If the watcher priority level is greater than the lowest on-going communication session priority level, the CM 240 preempts the lowest on-going communication session and establishes the new communication session 280 between the presentity 110 and the watcher 170 over the media channel previously used by the on-going communication session with the lowest priority.

To preempt the concurrent communication session with minimal inconvenience to the presentity 110, the CM 240 transmit a notification message to the presentity during the concurrent communication session 250 notifying the presentity 110 of the imminent preemption of the concurrent communication session 250. In addition, to minimize inconvenience to the communicator 210, the CM can further transmit a notification message to the communicator that provides a call back feature to the communicator 210 that enables the interrupted concurrent communication session 250 to be continued once a presentity media channel of the concurrent communication session's media type becomes available. Thus, if so desired, the communicator 210 can request the CM 240 to re-establish the concurrent communication session 250 upon the termination of another communication session with the presentity of that media type. For example, the CM 240 can re-establish the concurrent communication session 250 when the new communication session 280 is terminated. As another example, if the maximum number of presentity interactions (number of media channels) for that media type is greater than one, the CM 240 can re-establish the concurrent communication session 250 when any one of the ongoing communication sessions of that media type terminates, and therefore, one of the media channels becomes available.

In another embodiment, the preemption feature can be extended to specific communication sessions, regardless of the particular priority level granted to the watcher 170 by the presentity 110. For example, if the concurrent communication session 250 between the presentity 110 and the communicator 210 is an emergency communication session, the presentity 110 and/or the communicator 210 can temporarily set the priority level for the communicator to the highest priority level in order to prevent the concurrent communication session 250 from being preempted. As another example, if the new communication session 280 is an emergency (or otherwise urgent) communication session, the watcher 170 can indicate that the communication session is urgent in the request 205, and the query 215 sent to the CM 240 can identify the requested new communication session 280 as urgent. As a result, the CM 240 can temporarily set the priority level for the watcher 170 to the highest priority level for the requested communication session 280 to enable the communication session 280 to be immediately routed to a proper media channel via which the presentity 110 can be reached.

In a further embodiment, the preference information 190 for the presentity 110 can further include one or more non-preemptive media channels for one or more devices associated with the presentity 110 to prevent communication sessions on some devices from being preempted. For example, the presentity 110 may have two cell phones, one of which is primarily used for personal use, and therefore, not want the personal cell phone to be preempted by work. As another example, the presentity 110 may be waiting on an important call to his/her cell phone from a customer, and therefore, can temporarily set the media channels associated with the cell phone to non-preemptive media channels.

In addition, by providing the presentity 110 with the ability to set some media channels as non-preemptive media channels, watchers with lower priorities can initiate communication sessions to the presentity 110 without the risk of preemption. Therefore, in an exemplary embodiment, the presentity 110 or the communications system 200 can instruct the CM 240 to initially attempt to route incoming communication sessions to a non-preemptive media channel, and only to a preemptive media channel if no non-preemptive media channel is available. Furthermore, the watcher 170 can request that the new communication session 180 be routed to a non-preemptive media channel, if one is available.

In another exemplary embodiment, the presentity's presence information that is displayed to the watcher 170 by the presence server 160 can include preemptive priority information for each media type of the presentity. The preemptive priority information indicates whether the presentity 110 has an available non-preemptive communication channel in a particular media type, thus informing the watcher whether a new communication session in that particular media type may be preempted.

In addition to setting a respective priority level for each watcher, in other embodiments, the preference information 190 also includes respective watcher priority levels for each media type and/or watcher priority levels for each presentity device/application per media type. As an example, the presentity 110 can indicate that for the voice media type, the watcher 170 has a high priority, but for the text media device, the watcher 170 has a low priority. As another example, the presentity can indicate that for the voice media type, the watcher 170 has a high priority for the presentity's cell phone, and a lower priority for the presentity's desktop phone.

It should be noted that the CM 240 may be constructed or configured using hardware, software, firmware, or combination thereof for managing communication sessions (e.g., real-time and non-real-time voice, text and multimedia communication sessions). As an example, the CM 240 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein. In one embodiment, the CM 240 can include one or more processes, such as software applications providing an activity, a function, or a systematic sequence of tasks that produces a specified result, for managing communications sessions.

Figure 3:
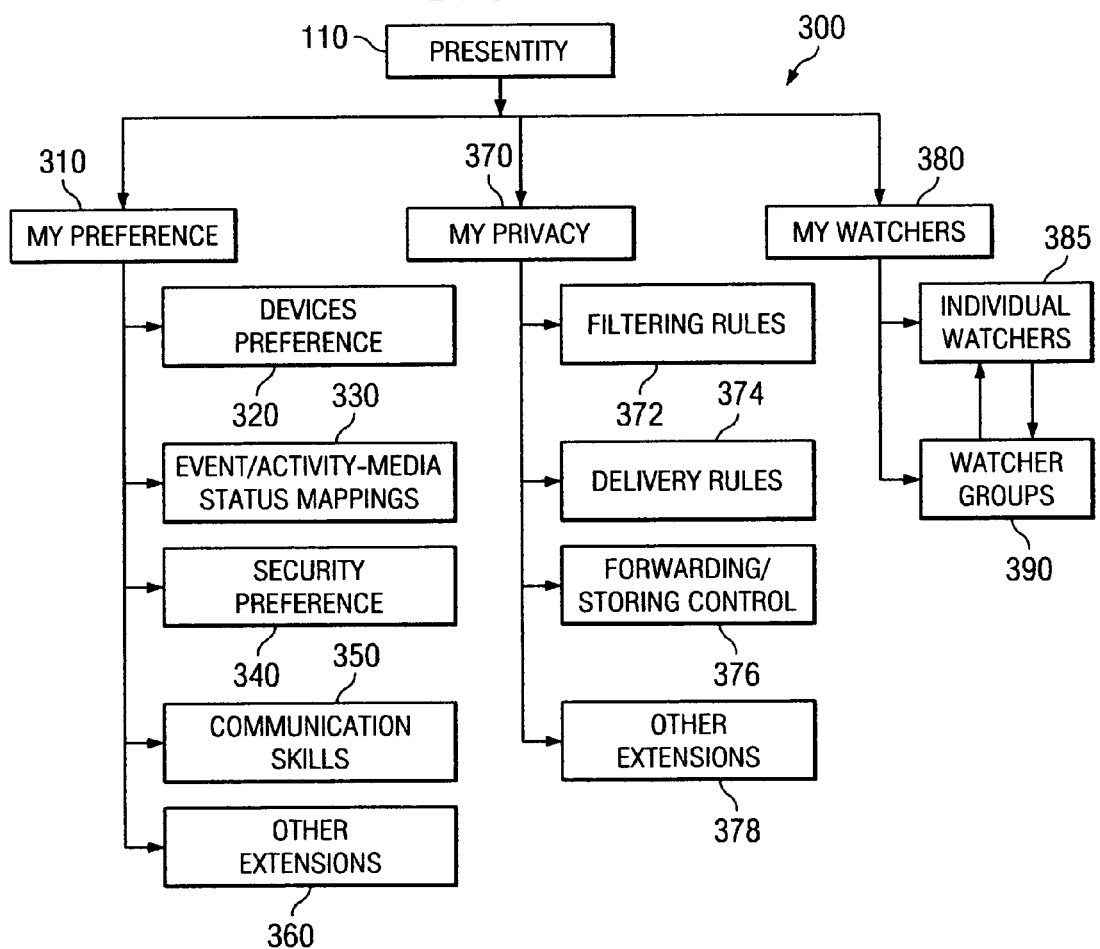
FIG. 3 illustrates an exemplary preference data structure for a presentity, in accordance with embodiments of the present invention.

FIG. 3 illustrates an exemplary preference data structure 300 for storing the preference information, in accordance with embodiments of the present invention. For each presentity 110, the presence server can store presentity preference information relating to communications 310, privacy 370 and watchers 380. Under communication preferences 310, the presentity can enter device preferences 320, event/activity-media status mapping preferences 330, security preferences 340, communication skills preferences 350 and other types of preferences 360.

For example, under device preferences 320, the presentity 110 can rank his or her devices in order of preferred device and/or preferred device for each media type. As an example, the presentity 110 can indicate that for voice applications, the presentity 110 prefers communication sessions to be routed to the presentity's desktop phone first, and if the desktop phone is unavailable, then to the presentity's cell phone, and if both are unavailable, to the presentity's PC, followed by the presentity's PDA. However, for text applications, the presentity 110 can indicate that the presentity 110 prefers communication sessions to be routed to the presentites' PDA first, and then to the presentity's PC. In addition, for multi-media applications, the presentity 110 can indicate that the presentity 110 prefers communication sessions to be routed to the presentites' PC first, and then to the presentity's cell phone.

Media status is impacted by the presentity's currently activity. Thus, the presentity 110 can indicate the media status of one or more media types depending on the current presentity activity. Media status can be in one of the four states, i.e., Active, In-Use, Busy and Inactive. For example, when a scheduled meeting starts, a notification is sent to the presence server. Examples of event/activity-media status mapping preferences 330 include a preference that when the presentity 110 is in a scheduled meeting, no voice communication sessions are allowed (i.e., the media status of the voice media type is "Inactive"), but text communications are allowed (i.e., the media status of the text media type is "Active").

Security preferences 340 may also be important to the presentity 110 for particular media types and/or communication sessions with particular watchers to prevent real-time and non-real-time unauthorized access to the communication session by a third party. For example, a presentity 110 can specify the preferred supported security protocols per device, per application and per media type.

Communication skills preferences 350 enable a presentity 110 to specify the presentity's language skills and their preference for real-time communications, per device, per application and per media type. For example, a Chinese employee presentity that is able to communicate in English, Chinese and, perhaps other languages can configure his or her language preference such that Chinese is preferred for voice applications, but English is preferred for text applications. In addition, the communication skills preferences 350 enable a presentity 110 to indicate the maximum number of interactions (concurrent communication session) per media type before the media status enters the Busy state.

Under privacy preferences 370, the presentity 110 can enter filtering rules 372, delivery rules 374, forwarding/storing control rules 376 and other types of rules 378. Under filtering rules 372, the presentity 110 can enter indicate the viewing scope of the presentity's presence information per watcher and/or watcher group. For example, a presentity 110 can specify the type and amount of the presentity's presence information that is disclosed to a watcher or watcher group.

Delivery rules 374 enable a presentity 110 to specify the delivery mode (secured/unsecured) of his/her presence information. The delivery mode might be different for various presence attributes depending on their sensitivity. The forwarding/storing control rules 376 equips the presentity 110 with the capability to decide whether his/her presence information is permitted to be forwarded to third parties by a watcher or a watcher group member or saved locally by a watcher or a watcher group member.

Under watcher preferences 380, the presentity 110 can enter individual watcher preferences 385 and watcher group preferences 390. An individual watcher refers to an individual session initiator, while a watcher group refers to one or more session initiators belonging to a group. For example, the "Accounting Department" may be a watcher group, even if the group only has a single watcher. An individual watcher can also be included in multiple watcher groups. The members of a watcher group can be linked to their individual watcher records to avoid the redundancy and maintain the consistency of watcher information. The presentity 110 can grant priority levels to both individual watchers and watcher groups. For example, the presentity 110 can grant everyone in his department (watcher group) a specific priority, but also grant his or her boss a higher priority than the watcher group.

Figure 4:
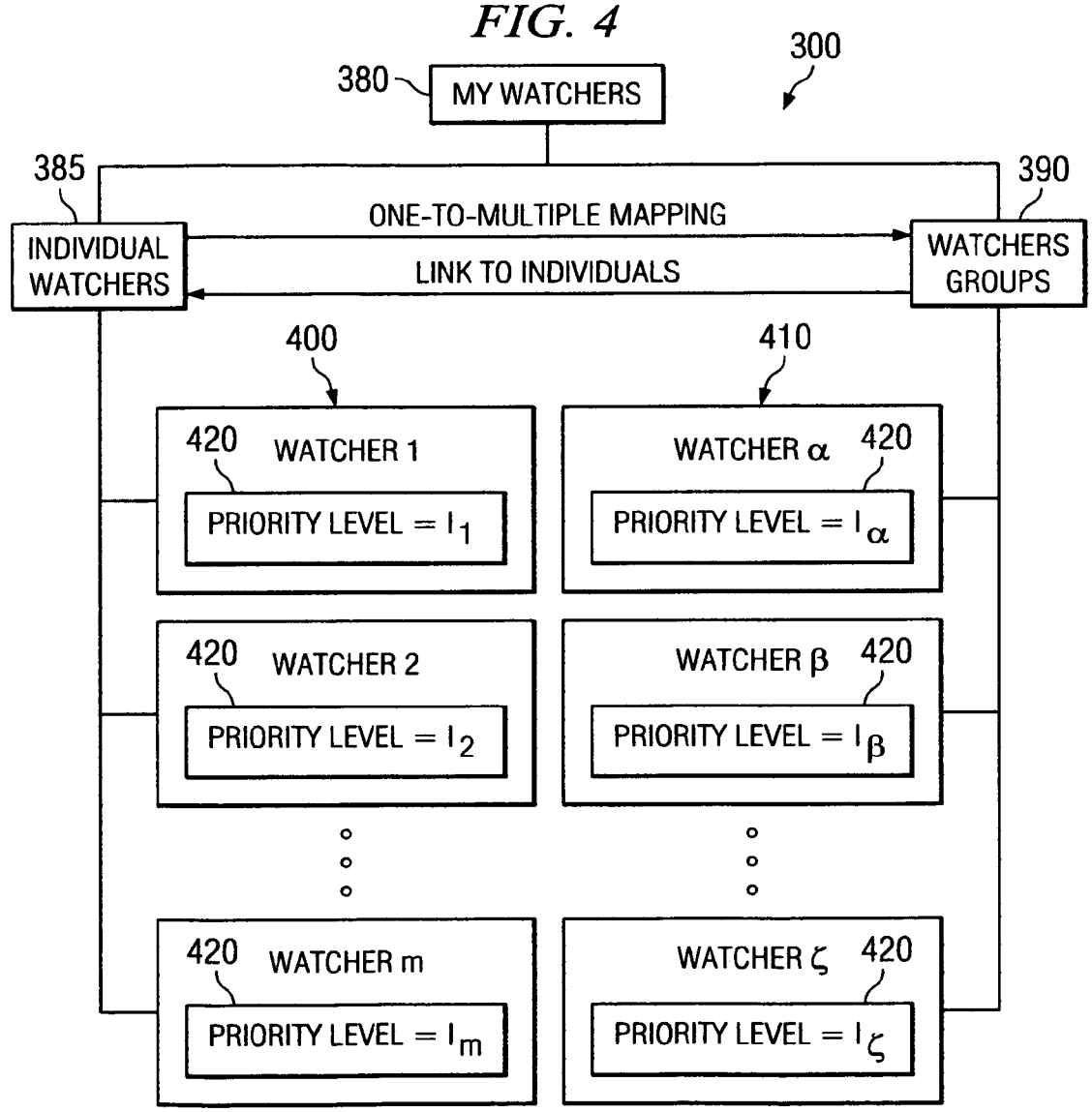
FIG. 4 illustrates an exemplary preference data structure including watcher priorities for a presentity, in accordance with embodiments of the present invention.

FIG. 4 illustrates an exemplary preference data structure 300 including watcher preferences 380 for a presentity, in accordance with embodiments of the present invention. As discussed above, a presentity's watcher preferences 380 can include both individual watcher preferences 385 and watcher group preferences 390. One specific type of watcher preference for individual watchers 400 is a priority level 420. For each watcher 400 that subscriber to the presentity's presence information, the presentity can enter a priority level 420 for that watcher 400. In addition, the presentity can establish a default priority level for all watchers 400 not granted a specific priority level and other users who are not watchers 400 of the presentity. In addition, each watcher group 410 can be granted a particular priority level 420 by the presentity The watcher group priority level 420 can be configured by the presentity, or, alternatively, determined from the priority levels granted to the individual watchers in the watcher group. For example, in one embodiment, the watcher group priority level 420 can be the lowest priority level granted to the individual watchers in the group. In another embodiment, the watcher group priority level 420 can be the highest priority level granted the individual watchers in the group. In a further embodiment, the watcher priority level 420 can be the average of the priority levels granted to the individual watchers in the group.

Figure 5:
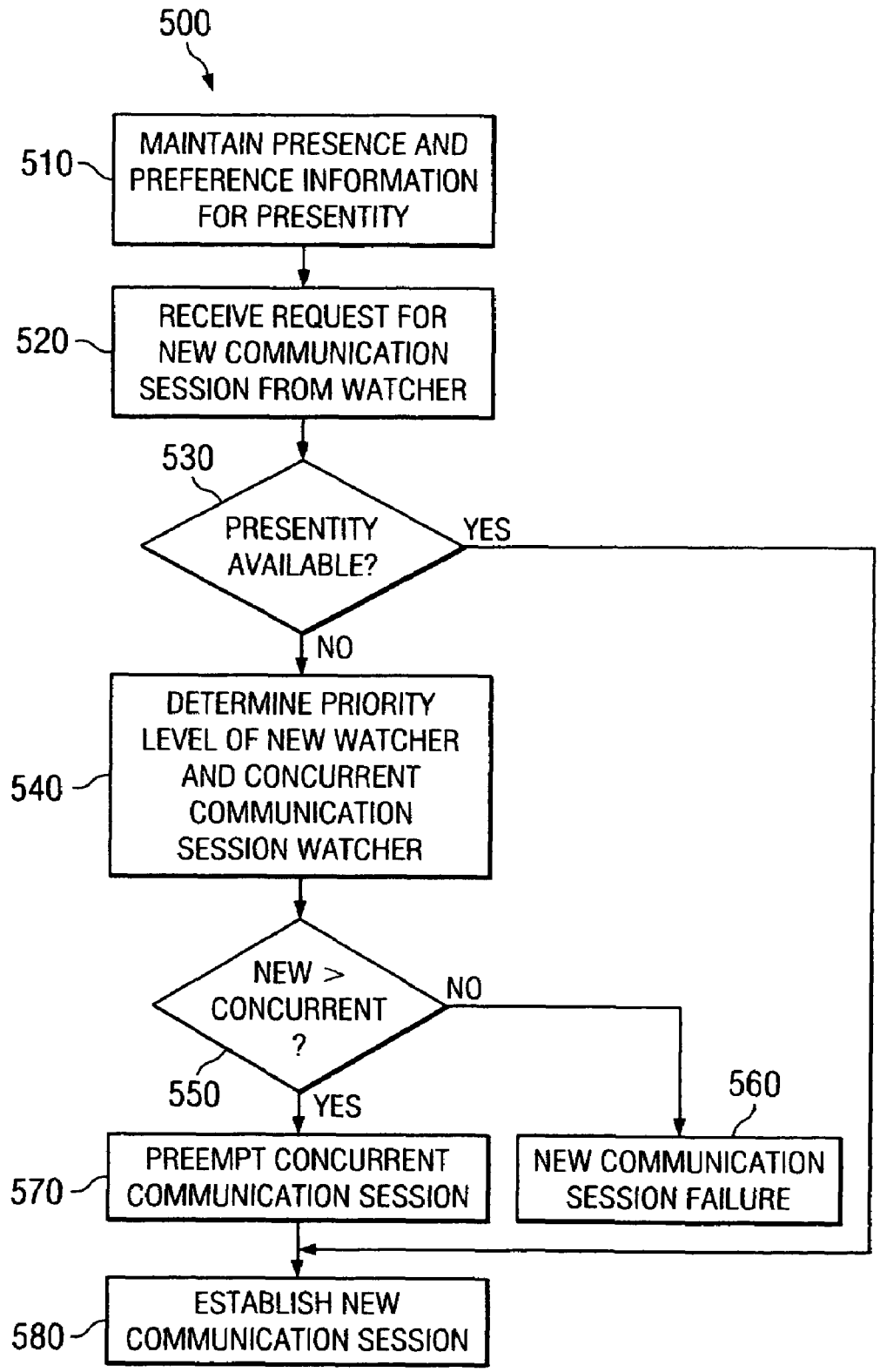
FIG. 5 is a flowchart illustrating an exemplary process for providing preemption features in real-time communication sessions using preference and presence settings of a presentity, in accordance with embodiments of the present invention.

FIG. 5 is a flowchart illustrating an exemplary process 500 for providing preemption features in real-time communication sessions using preference and presence settings of a presentity, in accordance with embodiments of the present invention. Initially, at block 510, a presence system maintains presence and preference information for a presentity. Therefore, when a request for a new communication session in a particular media type with a presentity is received from a watcher, at block 520, the presence system uses the presence information to determine whether the presentity has any media channels currently available for that particular media type, at block 530. If so, the new communication session is established towards one of the available media channels of the presentity at block 580. For example, if the presentity has allocated one or more non-preemptive media channels, the new communication session can be routed to one of the non-preemptive media channels.

However, if the presentity is currently engaged in one or more concurrent communication sessions in the requested media type, such that the presentity is unavailable for the new communication session, at block 540, the priority level granted to the watcher by the presentity and the lowest priority level granted to one of the parties involved in one of the concurrent communication sessions is determined from the presentity watcher preference information. At block 550, if the watcher priority level is greater than the lowest priority level associated with one of the concurrent communication sessions, the lowest priority concurrent communication session is preempted at block 570, and the new communication session between the presentity and the watcher is established at block 580.

However, if, at block 550, the watcher priority level is not greater than the lowest priority level associated with one of the concurrent communication sessions, the new communication session fails at block 560, and a failure message is generated and sent to the watcher. The failure message can include, for example, an error code identifying the reasons that the communication session failed.

Figure 6:
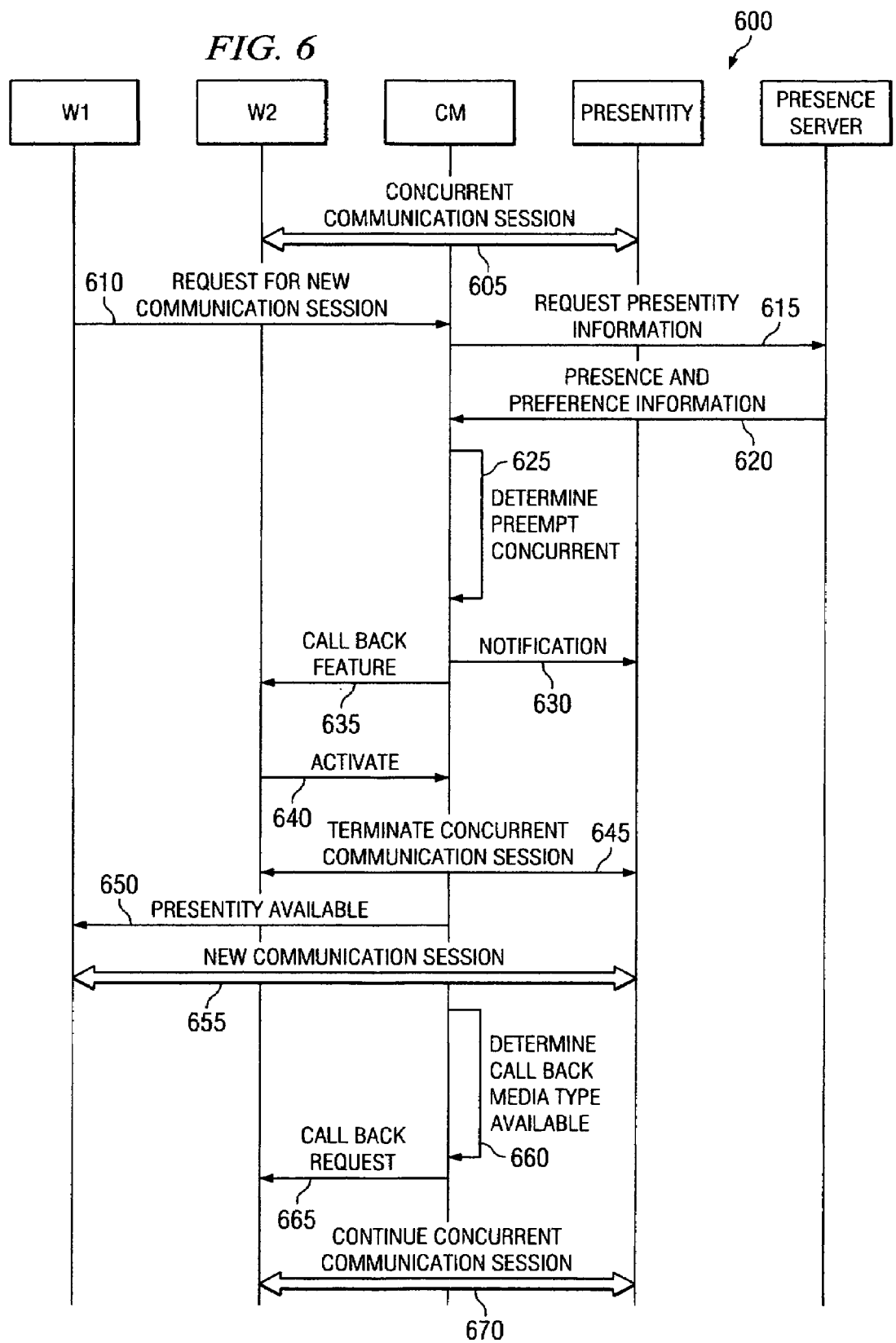
FIG. 6 is a signal flow diagram illustrating an exemplary call flow for preempting and reestablishing a concurrent communication session with a presentity, in accordance with embodiments of the present invention.

FIG. 6 is a signal flow diagram illustrating an exemplary call flow 600 for preempting and reestablishing a concurrent communication session with a presentity, in accordance with embodiments of the present invention. In FIG. 6, at 605, a concurrent communication session of a particular media type is established between a presentity and a watcher (W2) 210. At 610, another watcher (W1) 170 sends a request for a new communication session with the presentity in the same media type. Upon receipt of the request at the communications manager (CM) 240 associated with the presentity 110, at 615 and 620, the CM 240 extracts the presence and preference information of the presentity 110 from the presence server 160.

Based on the presentity's presence and preference information, at 625, the CM 240 determines that the presentity 110 is unavailable for the new communication session due to the concurrent communication session, and the priority level of W1 170 is greater than the priority level of W2 210, and therefore, the concurrent communication session should be preempted. To preempt the concurrent communication session, at 630, the CM 240 transmit a notification message to the presentity 110 during the concurrent communication session notifying the presentity 110 of the imminent preemption of the concurrent communication session. In addition, at 635, CM 240 transmits a notification message to W2 210 that provides W2 210 with the option of a call back feature. At 640, W2 sends a reply message to the CM 240 that activates the call back feature to enable the interrupted concurrent communication session to be continued once a presentity media channel of the concurrent communication session's media type becomes available.

Thereafter, at 645, the CM 240 terminates the concurrent communication session between the presentity 110 and W2 210, and, at 650, transmits an available message to W1 170, informing W1 170 that the presentity 110 is available for the new communication session. At 655, the new communication session between the presentity 110 and W1 170 is established in the requested media type. Upon the determination that the presentity now has a media channel currently available for that particular media type, at 660, the CM 240 sends a call back request to W2 210 to re-establish the interrupted concurrent communication session at 665 and 670. For example, the CM 240 can re-establish the concurrent communication session when the new communication session is terminated. As another example, if the number of media channels for that media type is greater than one, the CM 240 can re-establish the concurrent communication session when any one of the on-going communication sessions of that media type terminates, and therefore, one of the media channels becomes available.

Figure 7:
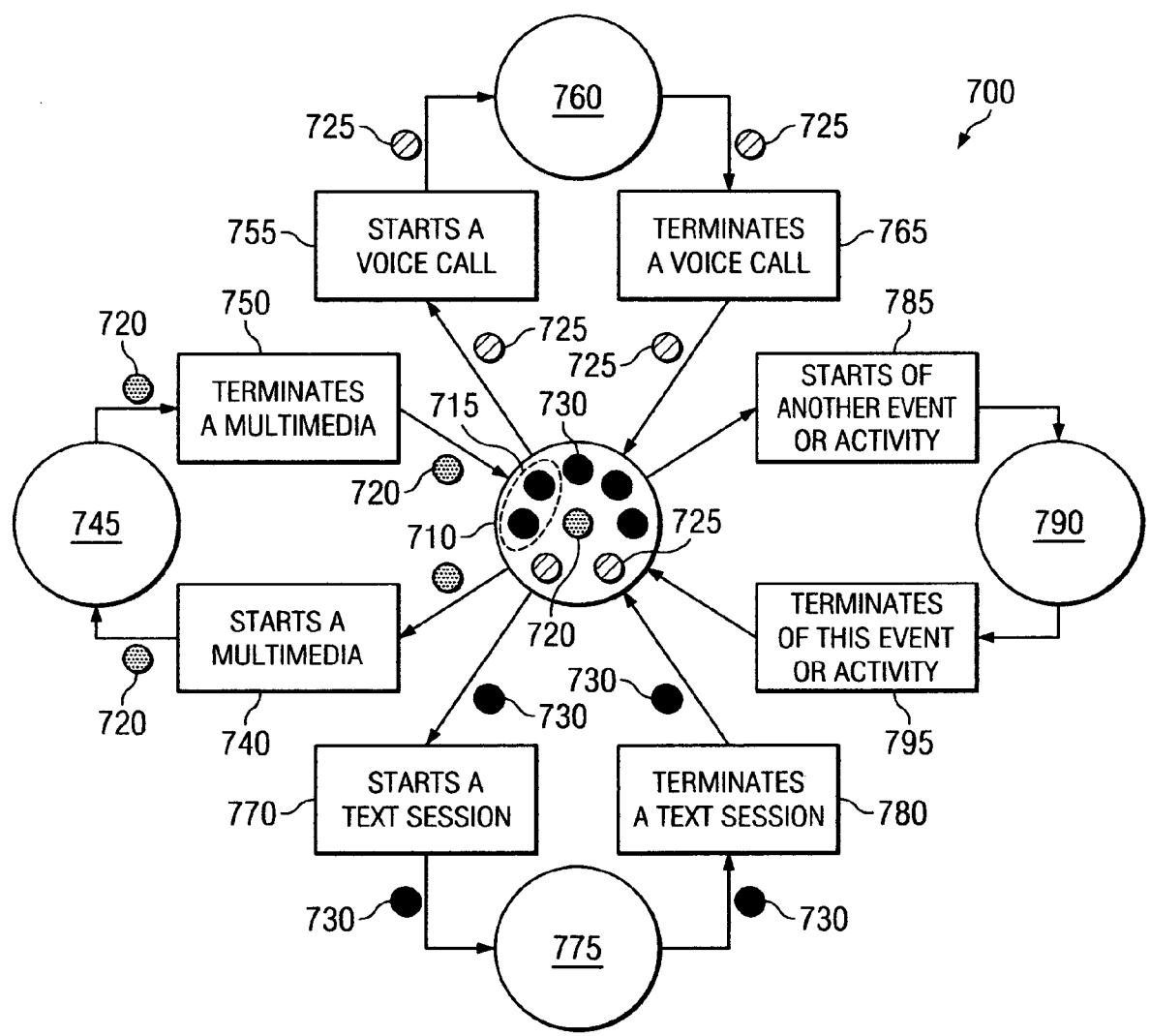
FIG. 7 illustrates an exemplary token model of preemptive and non-preemptive media usage of a presentity, in accordance with embodiments of the present invention.

FIG. 7 illustrates an exemplary token model 700 of media usage of a presentity, in accordance with embodiments of the present invention. A typical use of colored tokens is to represent different types of resources. For example, colored tokens play a significant role in simulating a wide range of distributed and concurrent systems using Colored Petri Nets (CP-Nets or CPNs) techniques. In embodiments of the present invention, colored tokens can be used to indicate presentity's communications capabilities corresponding to the three different media types for real-time communications. Thus, the colored tokens can be used to simulate the maximum number of interactions and the number of currently available channels of each of the media types.

In FIG. 7, shadings are used in place of colors, and the set includes three different shadings: black 730, which corresponds to real-time text capabilities; striped 725, which corresponds to real-time voice capabilities; and dotted 720, which corresponds to real-time mm (video+) capabilities. Per presentity, the shaded tokens 720, 725 and 730 represent the available resources (i.e., media channels) that can be used in real-time communications. In FIG. 7, the presentity has identified two of the real-time text token media channels (surrounded by dotted line 715) as non-preemptive media channels. The rest of the tokens all represent preemptive media channels that may be preempted by another watcher.

All of the tokens 720, 725 and 730 are initially put into a presentity pool 710 that is identified by the presentity's identifier (which is unique to the presence system). One or more tokens are consumed at the time a real-time communication session is started, and the same tokens are returned to the presentity pool 710 as soon as the communication session is terminated. Thus, a watcher viewing the tokens in the presentity pool 710 can determine what media channels in each media type are currently available for the presentity, and whether any of the available media channels in a particular media type are non-preemptive to assist the watcher in deciding whether to initiate a communication session with the presentity and which media type to use. As an example, if the watcher wants to ensure that the communication session will not be preempted, the watcher can select a media type for which there is an available, non-preemptive media channel.

For example, when a presentity starts a multimedia session (represented by block 740), a dotted token 720 is moved from the presentity pool 710 to a multimedia communication session pool 745. Once the multimedia session is terminated (represented by block 750), the dotted token 720 is moved from the multimedia communication session pool 745 to the presentity pool 710. Likewise, when a presentity starts a voice communication session (represented by block 755), a striped token 725 is moved from the presentity pool 710 to a voice communication session pool 760. Once the voice session is terminated (represented by block 765), the striped token 725 is moved from the voice communication session pool 760 to the presentity pool 710.

In addition, when a presentity starts a text communication session (represented by block 770), a black token 730 is moved from the presentity pool 710 to a text communication session pool 775. Once the text communication session is terminated (represented by block 780), the black token 730 is moved from the text communication session pool 775 to the presentity pool 710. The model also allows for an activity-media status mapping to move tokens of one or more media types upon the start/termination of a scheduled activity. When a presentity starts an event or activity that affects the resources of one or more media types (represented by block 785), the token(s) representing the affected media types are moved from the presentity pool 710 to an event pool 790. Once the event/activity is terminated (represented by block 795), the token(s) are moved from the event pool 790 to the presentity pool 710.

The media status of the presentity and his/her communications availability are impacted by the number and type of shaded tokens in the resource pool 710. The overall media status of the presentity is set to INACTIVE when all of the tokens are in the presentity pool 710. For a media type $\in$ {text, voice, multimedia}, if there is at least one token in the presentity pool 710 that corresponds to the media type, or the number of tokens for the media type outside of the presentity pool 710 is less than the minimum of the number of currently available communication channels that support this media type and the maximum number of interactions specified by the presentity for this media type, the media status for the media type is set to IN USE.

For a media type $\in$ {text, voice, multimedia}, if there are no tokens in the presentity pool 710 that correspond to the specific media type or the number of tokens for the media type outside of the presentity pool 710 is equal to the minimum of the number of currently available communication channels that support this media type and the maximum number of interactions specified by the presentity for this media type, the media status for the media type is set to BUSY. For a media type $\in$ {text, voice, multimedia}, the media status of the media type is set to ACTIVE when the number of tokens in the presentity pool 710 that correspond to the specific media type is equal to the minimum of the maximum number of interactions specified by the presentity and the number of currently activated and available media instances (communication channels) for this media type.

The presentity's availability for real-time communication depends on his/her overall media status. For example, the presentity is available if there is at least one media type of which the current state is ACTIVE or IN USE. Otherwise, the presentity is unavailable to watchers to engage in additional real-time communication sessions.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A communications system for providing hotline and preemption features in real-time communication sessions, comprising:

a presence server capable of collecting presence information and preference information on a plurality of presentities, wherein said presence information for each of said plurality of presentities includes availability of said respective presentity and said preference information for each of said plurality of presentities includes a priority level granted to one or more watchers of said respective presentity; and a communications manager connected to receive a request for a new communication session with a select one of said plurality of presentities from a select one of said watchers in a select one of a plurality of media types;

wherein said communications manager is operable to extract said presence information and said preference information of said select presentity from said presence server;

wherein, in response to unavailability of said select presentity due to a concurrent communication session in said select media type, said communications manager is further operable to determine said priority level of said select watcher and said priority level of said watcher involved in said concurrent communication session and preempt said concurrent communication session when said priority level of said select watcher is greater than said priority level of said watcher involved in said concurrent communication session.

2. The communications system of claim 1, wherein said preference information for each of said plurality of presentities includes a different priority level for each of said media types for each of said one or more watchers of said presentity.

3. The communications system of claim 2, wherein said preference information for each of said plurality of presentities includes a different priority level for each of said devices associated with said presentity for each of said one or more watchers of said presentity.

4. The communications system of claim 3, wherein said preference information for said select presentity includes one or more non-preemptive channels for one or more of said devices associated with said select presentity, and wherein said concurrent communication session is not preempted when connected over one of said non-preemptive channels.

5. The communications system of claim 4, wherein said communications manager is further operable to route said new communication session to one of said non-preempted channels when both said one of said non-preemptive channels and a preemptive channel capable of being preempted are available for said select presentity.

6. The communications system of claim 1, wherein said communications manager is a software component on said presence server.

7. The communications system of claim 1, wherein said select watcher is an individual watcher or a watcher group.

8. The communications system of claim 1, wherein said presence server is further operable to provide said presence information and preemptive priority information for each of said media types of said select presentity to said select watcher, said preemptive priority information indicating whether said new communication session can be preempted.

9. The communications system of claim 1, wherein said communications manager is further operable to transmit a notification message to said select presentity during said concurrent communication session notifying said select presentity of the preemption of said concurrent communication session.

10. The communications system of claim 1, wherein said communications manager is further operable to provide a call back feature to said watcher of said concurrent communication session to continue said concurrent communication session upon the termination of another communication session with said select presentity of said select media type.

11. The communications system of claim 1, wherein said priority level of said select watcher is altered based on the type of new communication session.

12. The communications system of claim 1, wherein said priority level of said select watcher is the highest priority level to provide a hotline between said select presentity and said select watcher for said select media type.

13. A method for providing hotline and preemption features in real-time communication sessions, comprising the steps of:

providing presence information and preference information for a presentity, said presence information including availability of devices of said presentity and said preference information includes a priority level granted to one or more watchers of said presentity; and receiving a request for a new communication session with said presentity from a select one of said watchers in a select one of a plurality of media types;

in response to unavailability of said select presentity due to a concurrent communication session in said select media type, determining said priority level of said select watcher and said priority level of said watcher involved in said concurrent communication session; and preempting said concurrent communication session when said priority level of said select watcher is greater than said priority level of said watcher involved in said concurrent communication session.

14. The method of claim 13, wherein said preference information for said presentity includes a different priority level for each of said media types for each of said one or more watchers of said presentity.

15. The method of claim 13, wherein said preference information for said presentity includes a different priority level for each of said devices associated with said presentity for each of said one or more watchers of said presentity.

16. The method of claim 15, wherein said preference information for said presentity further includes one or more non-preemptive channels for one or more of said devices associated with said presentity, and further comprising the step of:

maintaining said concurrent communication session when connected over one of said non-preemptive channels.

17. The method of claim 16, wherein said preempting further comprises the step of:

preempting said concurrent communication session when said priority level of said select watcher is greater than said priority level of said watcher involved in said concurrent communication session and said priority level of said watcher involved in said concurrent communication session is the lowest priority level among all concurrent communication sessions for said select media type.

18. The method of claim 13, further comprising the step of:

providing said presence information and preemptive priority information for each of said media types of said subscriber to said select watcher, said preemptive priority information indicating whether said new communication session can be preempted.

19. The method of claim 18, wherein said preempting further comprises the step of:

transmitting a notification message to said presentity during said concurrent communication session notifying said presentity of the preemption of said concurrent communication session.

20. The method of claim 13, further comprising the step of:

continuing said concurrent communication session upon the termination of another communication session with said presentity of said select media type.

21. The method of claim 13, further comprising the step of:

altering said priority level of said select watcher is altered based on the type of new communication session.

* * * * *